(12) United States Patent
Kalish et al.

(10) Patent No.: US 6,304,704 B1
(45) Date of Patent: Oct. 16, 2001

(54) MODE MIXING BUFFERED OPTICAL FIBER APPARATUS AND METHOD FOR MAKING

(75) Inventors: David Kalish, Roswell; Paul Emilien Neveux, Jr., Loganville; Albert John Ritger; Carl Raymond Taylor, both of Lawrenceville; John Michael Turnipseed, Lilburn, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/361,657

(22) Filed: Jul. 27, 1999

(51) Int. Cl.$^7$ ............................. G02B 6/02; G02B 6/22
(52) U.S. Cl. ................................. 385/128; 385/122
(58) Field of Search ........................ 385/128, 122–127; 65/420

(56) References Cited

U.S. PATENT DOCUMENTS

| | | |
|---|---|---|
| 4,038,062 | 7/1977 | Presby ........................... 65/2 |
| 4,212,660 | 7/1980 | Maurer ........................... 65/3 |
| 4,410,344 | 10/1983 | Iyengar ........................... 65/3.11 |
| 4,629,286 * | 12/1986 | Fuse et al. ........................ 385/128 |
| 4,637,686 | 1/1987 | Iwamoto et al. ................. 350/96.29 |
| 4,913,859 | 4/1990 | Overton et al. .................. 264/1.4 |
| 5,000,772 | 3/1991 | Pestisce ........................... 65/3.11 |
| 5,147,433 | 9/1992 | Pestisce ........................... 65/3.11 |
| 5,613,028 | 3/1997 | Antos et al. ..................... 385/123 |
| 5,838,862 | 11/1998 | Chien ............................. 385/102 |
| 5,867,616 | 2/1999 | Antos et al. ..................... 385/11 |
| 6,108,476 * | 12/1986 | Iimura ............................. 385/128 |

FOREIGN PATENT DOCUMENTS 19810812    9/1999   (DE) .

* cited by examiner

*Primary Examiner*—Phan T. H. Palmer
(74) *Attorney, Agent, or Firm*—John M. Harman

(57) ABSTRACT

Embodiments of the invention include an optical energy transmission system, method and apparatus having improved mode coupling. According to embodiments of the invention, an optical energy transmission medium such as an optical fiber includes bubbles formed therein for inducing microbending of the optical energy transmission medium, thus promoting advantageous mode coupling, which improves bandwidth potential by reducing dispersion. The bubbles are formed, e.g., in one or more buffer region layers and/or at the interface between the coating and buffer regions. The method for manufacturing the inventive optical energy transmission medium includes controllably forming one or more buffer region layers around the coated optical fiber or other transmission medium in such a way that that a desired amount of bubbles is created and maintained within one or more of the buffer region layers and/or at the interface between the coating and buffer regions. The bubbles form controlled perturbations that enhance mode coupling to the extent that bandwidth of the optical fiber is improved. The quantity and size of the bubbles formed in the optical energy transmission medium are controlled by, e.g., the amount of moisture present in the applied coating.

16 Claims, 4 Drawing Sheets

MODE MIXING BUFFERED OPTICAL FIBER APPARATUS AND METHOD FOR MAKING

BACKGROUND OF THE INVENTION

1. Field of the Invention

The invention relates to optical fiber and methods of manufacturing optical fiber. More particularly, the invention relates to optical fiber coatings and methods of coating optical fibers.

2. Description of the Related Art

High performance communications systems, i.e., those systems having gigabit transmission speeds, are being made possible by improving the bandwidth of optical fiber. However, achieving those desired transmission speeds in multimode fiber has been hindered by problems such as dispersion. Because multimode optical fibers are capable of propagating more than one mode of optical energy, an inherent problem with dispersion exists. Such dispersion, more specifically known as modal dispersion, is the broadening or spreading of an optical energy output pulse caused by delays resulting from various modes traveling through the optical transmission medium at different speeds. Such dispersion can be managed by mode mixing or mode coupling. i.e., the mixing or scrambling of the various modes in such a way that effectively reduces the difference in travel times of the various modes. The reduction in dispersion improves the bandwidth of the multimode optical fiber.

It has been recognized that certain microbending of multimode fiber often causes advantageous mode coupling or mode mixing. That is, the introduction of perturbations in the multimode cladding modes enhances mode coupling. Conventional approaches to inducing microbending has varied from externally inducing bends in the outer regions of the fiber (see, e.g., U.S. Pat. No. 4,038,062, which is co-owned with this application) to internally applying refractive index perturbations in the optical fiber preforms that subsequently are drawn into optical fibers (see, e.g., U.S. Pat. Nos. 5,867,616 and 5,613.028). Many conventional methods for inducing microbending techniques have had difficulty in controllably introducing perturbations and reliably reproducing the desired microbends. Furthermore. many conventional microbending techniques are undesirable from the standpoint of manufacturing cost and efficiency.

Accordingly, there remains a need for controllably inducing microbends in optical energy transmission medium such as optical fibers to enhance mode coupling therein.

SUMMARY OF THE INVENTION

The invention is embodied in a system for transmitting optical energy including a source of optical energy, an optical energy transmission medium such as an optical fiber and a receiver of optical energy. The optical energy transmission medium includes bubbles disposed therein for inducing microbending of the optical energy transmission medium, thus promoting advantageous mode coupling, which improves bandwidth potential by reducing dispersion. The bubbles are disposed, e.g., in one or more buffer region layers formed around the coating of an optical energy transmission medium such as an optical fiber. Alternatively, the bubbles are disposed at the interface formed between the buffer and coating regions of the optical energy transmission medium.

An alternative embodiment of the invention includes a method of making an optical energy transmission medium. The method includes providing an optical energy transmission medium with a core, a cladding region around the core and a coating region around the cladding region, and forming one or more buffer region layers around the coating region in such a way that a plurality of bubbles are maintained within one or more of the buffer region layers and/or at the interface between the buffer region and the coating region. The quantity and size of the bubbles disposed in the optical energy transmission medium are controlled, e.g., by the amount of moisture present in the coating region.

Yet another alternative embodiment of the invention includes a medium for transmitting optical energy within an optical communications system. The medium is, e.g., an optical fiber having a glass core and cladding region surrounded by one or more coating region layers made of ultraviolet (UV)-cured acrylate or other suitable material. The optical fiber is surrounded by one or more buffer region layers having a plurality of bubbles disposed within one or more of the buffer region layers and/or along the interface between the buffer region and the coating region. The bubbles form perturbations in the optical fiber in a manner that advantageously enhances mode coupling. The buffer region layers are made of a suitable material such as, e.g., poly(vinylidene fluoride) (PVDF) or other fluoropolymer, nylon, polyolefin, poly(vinyl chloride) (PVC), or polyester.

Still another alternative embodiment of the invention includes a method of transmitting optical energy in an optical communications system. The system includes an optical energy source. optical energy receiver and an optical energy transmission such as an optical fiber coupled therebetween. The transmission method includes providing an optical energy transmission medium that has bubbles disposed therein for inducing microbending of the optical energy transmission medium and enhancing mode coupling therein. The transmission method also includes transmitting optical energy from the source to the receiver through the optical energy transmission medium. The enhanced mode coupling resulting from microbending caused by the bubbles improves the bandwidth transmission characteristics of the transmission system.

DETAILED DESCRIPTION

Figure 1A:
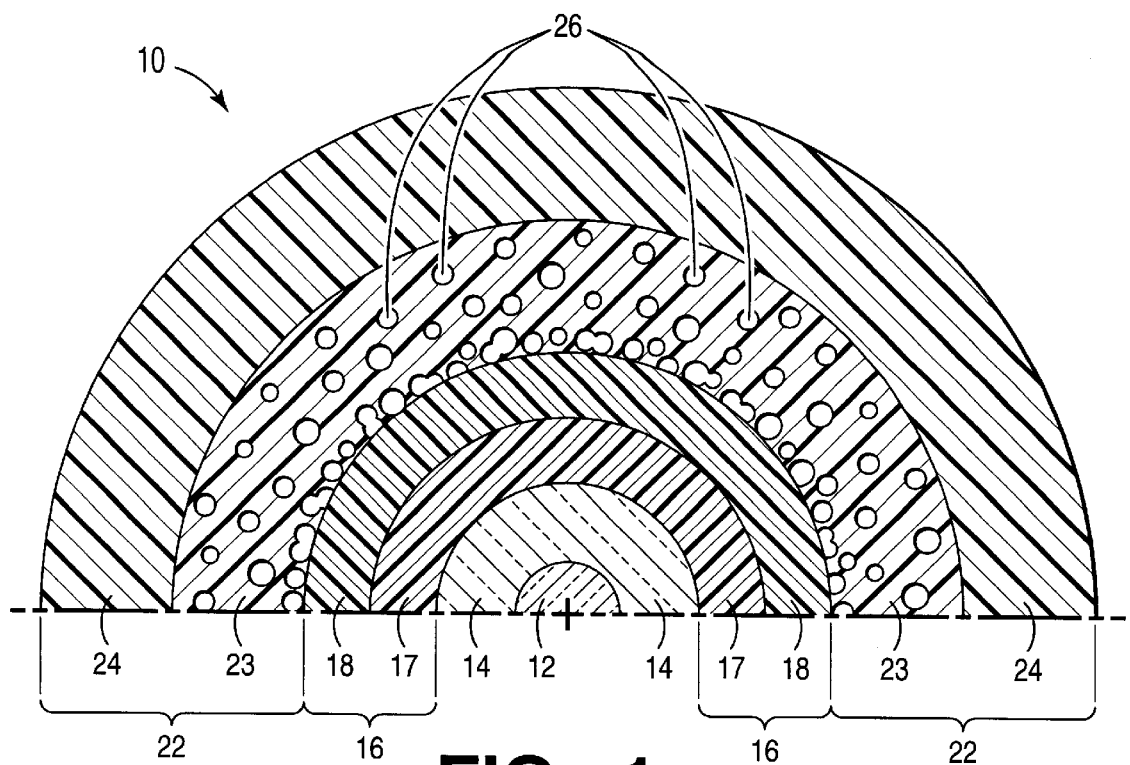
FIGS. 1a–1c are partial cross-sectional views of an optical energy transmission medium according to various embodiments of the invention.

In the following description similar components are referred to by the same reference numeral in order to simplify the sequential aspect of the drawings and/or to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Conventionally, an optical energy transmission medium such as an optical fiber includes a glass core region surrounded by a glass cladding region having an index of refraction lower than that of the core region and one or more protective coating layers. For a multimode optical fiber, the diameter of the core region is approximately 50 or 62.5 microns ($\mu$m), although other dimensions certainly are possible. Although the diameter of the core region may vary, typically, the total diameter of the cladding region surrounding the core region is approximately 125 $\mu$m. The optical fiber cladding region typically is covered, for protection and strength, with one or more coating region layers. e.g., a primary coating layer and a secondary coating layer, typically resulting in a total outer diameter of from approximately 250 $\mu$m to 1000 $\mu$m.

The optical fiber typically is formed from a glass preform containing a core rod inside of a cladding rod. The preform generally is suspended vertically and moved into a furnace at a controlled rate. The preform rod softens in the furnace and optical fiber is drawn from the molten end of the preform rod by a capstan located at the base of a draw tower.

One or more coating layers, which typically are made of thermoplastics or liquid applied curable plastic resins, are applied to the fiber immediately after the optical fiber is drawn and prior to contact between the fiber and any other surface. In this manner, one or more liquid-curable plastic resins such as a urethane acrylate is applied to the optical fiber and then cured into a protective coating region, typically by exposure to ultraviolet (UV) radiation. In some operations, a primary or inner coating layer is applied and cured into a primary coating region or layer and then a secondary or outer coating layer is applied and cured into a secondary coating region or layer.

Buffered optical fibers include a buffer region formed around the coating layers. The buffer region includes one or more layers of thermoplastic material such as nylon. polyolefin, poly(vinylidene fluoride) (PVDF) or other fluorpolymer, poly(vinyl chloride) (PVC), or polyester. The buffer region includes, e.g. a single layer or, alternatively, an inner buffer layer formed around the outer coating of the optical fiber and an outer buffer layer formed around the inner buffer layer. Typically, an extruder extrudes the one or more buffer region layers around the optical fiber.

As discussed previously herein, it has been recognized that microbending a multimode fiber often causes advantageous mode coupling or mode mixing. Conventional methods of microbending typically involve externally inducing bends via any number of physical configurations, or internally applying refractive index perturbations in the optical fiber preforms rods.

However, embodiments of the invention are based on the realization that the formation of bubbles within one or more buffer region layers and/or at the interface between the buffer region and the coating region of optical fibers or other suitable optical energy transmission media advantageously causes microbending of the optical fiber. In this manner, the microbending reduces the dispersion of optical energy transmitted through the optical fiber.

Furthermore, embodiments of the invention are based on the advantageous realization that the size and amount of bubbles formed in the optical fibers are controllable by several processing parameters, including the type of buffer material, the level of moisture in the curable coating, and certain buffering process conditions. Also, the dispersion of optical energy transmitted through of fiber is found to be based on, among other things, the size and frequency of the microbending bubbles present in the optical fiber. Thus, controlling one or more of the processing parameters affecting the size and frequency of bubbles, in turn, controls the dispersion characteristics of the optical fiber manufactured.

Also, as mentioned previously herein, the formation and presence of bubbles e.g., air bubbles, in optical fibers conventionally has been thought of as problematic. Thus, particular attention has been directed to avoiding the inclusion of air bubbles in coatings applied to optical fibers. For various coatings the air bubbles generally are considered to arise due to the entrainment of air carried with the surface of the optical fiber into the coating reservoir, due to the relatively high draw speeds employed.

Conventional devices have been designed to reduce air bubble incorporation in the coating by employing a partial vacuum in a chamber located above the surface of the liquid in the coating reservoir. The partial vacuum is generated by an air induction device which reduces pressure in the air atmosphere surrounding the optical fiber at the point where it enters the surface of the coating liquid in the reservoir.

Also, techniques are known for stripping entrained air or bubbles from the surface of the fiber after the fiber has entered the coating liquid reservoir. For example, conventional systems have been designed that create a countercurrent that sweeps bubbles from the surface of the optical fiber prior to its exit from the coating system.

However, according to embodiments of the invention, the controllable formation of bubbles including gaseous moisture bubbles in one or more buffer region layers surrounding the coating region and/or at the interface between the buffer region and the coating region is desired. The bubbles, when present in desirable size and numbers, cause microbending in a manner that improves mode coupling for reduced modal dispersion.

Referring now to FIG. 1, a portion of an optical energy transmission medium 10 according to embodiments of the invention is shown. The optical energy transmission medium 10, e.g., an optical fiber, includes a core region 12, a cladding region 14 surrounding the core region 12, and a coating region 16 surrounding the cladding region 14. Typically, the coating region 16 includes one or more coating region layers such as a primary or inner coating region layer 17 surrounding the cladding region 14 and a secondary or outer coating region layer 18 surrounding the inner coating region layer 17. A coated optical fiber typically refers to the core region 12, the cladding region 14 and the coating region 16.

The core region 12 and the cladding region 14 generally are made of glass and typically drawn from a glass preform. as discussed previously herein. The coating region 16 conventionally is formed by applying one or more layers of acrylate or other suitable material and then curing the layers with ultraviolet (UV) radiation.

Figure 1B:
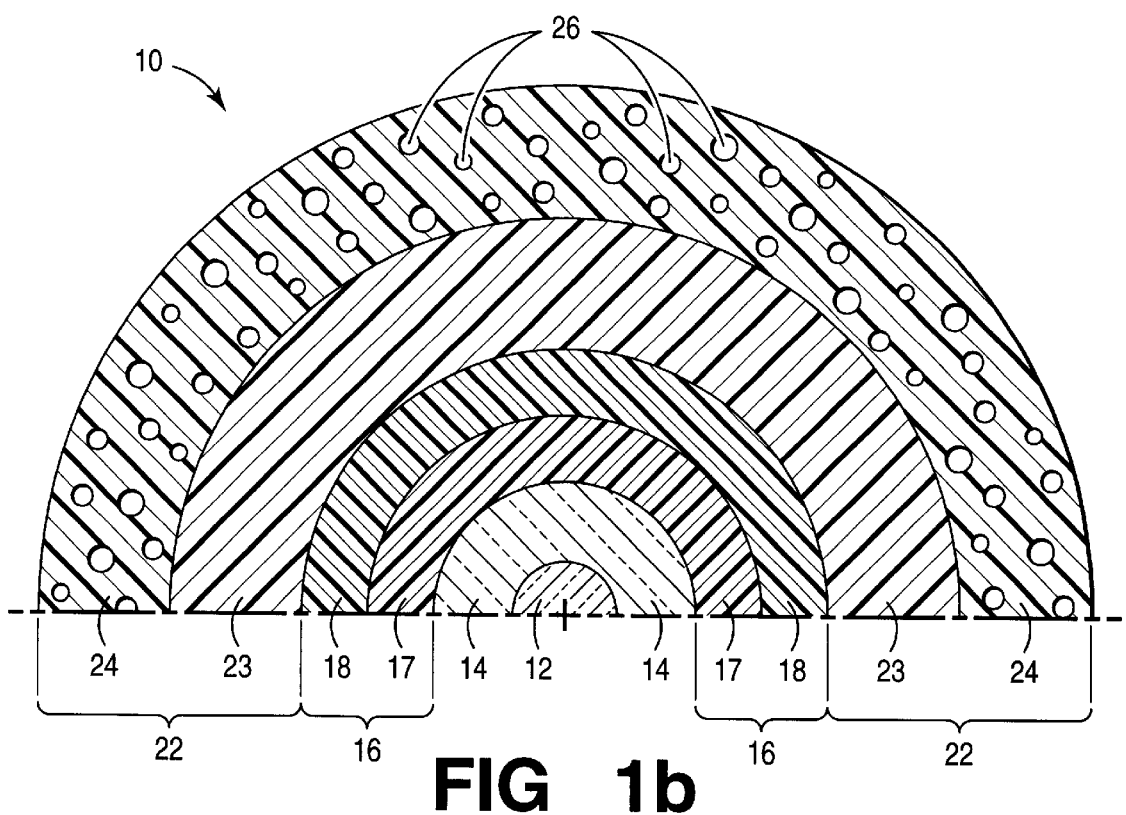
Figure 1C:
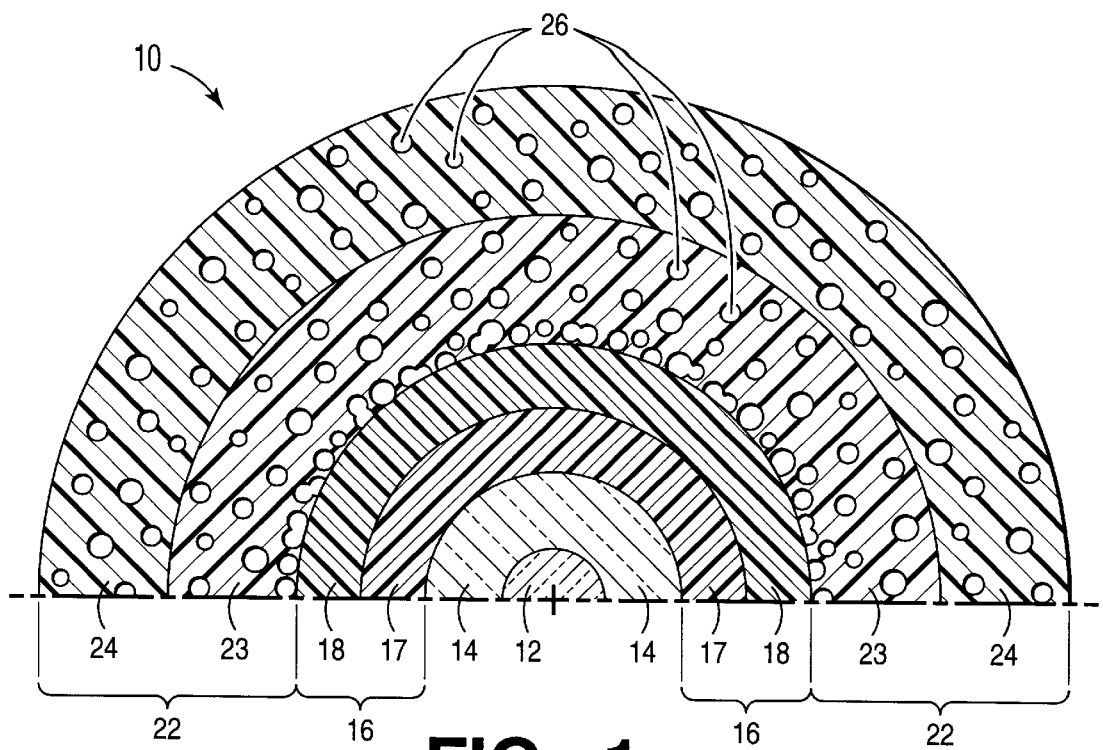

Buffered optical fibers include a buffer region 22 including one or more buffer region layers. e.g., an inner buffer region layer 23 formed around the coating region 16 of the optical fiber and an outer buffer region layer 24 formed around the inner buffer region layer 23. The buffer region layers are, e.g., extruded onto the coated optical fiber. Although two buffer region layers 23, 24 are shown, it is understood that the buffer region 22 can have any number of buffer region layers formed around the optical fiber, depending on the desired degree of protection. As discussed hereinabove, the layers of the buffer region 22 are made from a suitable coating material such as nylon, polyolefin, poly(vinylidene fluoride) (PVDF) or other fluoropolymer, poly(vinyl chloride) (PVC), or polyester. As shown in FIGS. 1a–c, according to embodiments of the invention, a plurality of bubbles 26 are present in the optical fiber 10 within one or more buffer region layers 23, 24 and/or at the interface between the coating region 16 and the buffer region 22. For example, bubbles 26 are contained in the inner buffer region layer 23 (FIG. 1a), the outer buffer region layer 24 (FIG. 1b) or both buffer region layers 23, 24 (FIG. 1c). Also, bubbles contained with the inner buffer region layer 23 may include bubbles disposed at the interface formed by the coating region 16 and the buffer region 22. As will be discussed in greater detail hereinbelow, the bubbles 26 are formed from outgassing of moisture from the coating region 16 as the buffer region 22 is formed on the coating region 16 and are based on a number of controlling parameters.

The presence of the bubbles 26 in the buffer region causes microbending in an advantageous manner, as discussed hereinabove. The bubbles 26 are a physical presence that causes perturbations in the optical fiber 10 that, as discussed previously herein, advantageously couple various modes of optical energy pulses transmitted through the optical fiber 10. The coupling reduces dispersion, which works to improve the bandwidth of the optical fiber 10.

Figure 2:
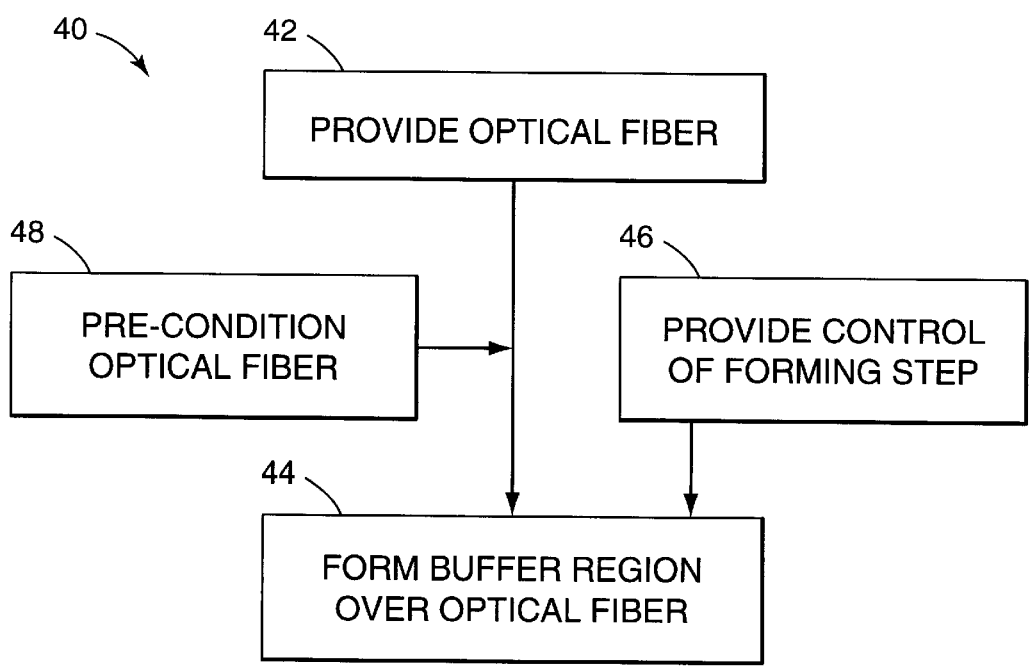
FIG. 2 is a simplified block diagram of a method for manufacturing an optical energy transmission medium according to embodiments of the invention.

Referring now to FIG. 2, with continuing reference to FIGS. 1a–c, a method 40 for manufacturing an optical energy transmission medium according to embodiments of the invention is shown. The method 40 includes a first step 42 of providing an optical energy transmission medium (e.g., an optical fiber) having a core region 12, a cladding region 14 and a coating region 16. As discussed previously herein, the core and cladding regions of the optical fiber typically are drawn from a preform as the preform is guided through a furnace. The fiber, which is drawn at a temperature of approximately 1200–1800° C., is cooled subsequently to a temperature below approximately 90° C. before the one or more coating layers of the coating region are applied. Typically, cooling methods include passing the drawn optical fiber through some type of cooling device positioned beneath the furnace. The cooling device uses. e.g., a suitable gaseous and/or liquid coolant.

The coating region layers 17, 18 are applied by passing the uncoated optical fiber (i.e., the core and cladding regions) through a coating device or die positioned beneath the furnace and the cooling device. The coating die has a liquid coating reservoir with a replenishable supply of curable coating liquid such as urethane acrylate. The coating device applies the coating liquid to the optical fiber as the optical fiber passes therethrough. The coating die has an exit port positioned downstream of the coating reservoir through which the optical fiber is transported out of the die. The exit port is dimensioned and configured to removes excess coating material from the fiber surface prior to its exit from the coating device.

Once applied, the coating is cured using, e.g., UV radiation, by passing the optical fiber through a curing chamber, having a UV lamp, positioned below the coating device. As the coated optical fiber passes through the curing chamber, the UV radiation emitted from the lamp cures the coating to form the coating region 16, which protects the core and cladding regions. The coating region includes one or more coating layers, which can be formed simultaneously or sequentially.

The next step 44 is to form a buffer region 22 over the coated optical fiber. Once the coated optical fiber has been sufficiently cooled, it is taken up, e.g., in a conventional manner. From there, the coated optical fiber is transported, e.g., to a buffer jacketing line, which forms one or more buffer region layers made of, e.g., nylon, polyolefin. poly (vinylidene fluoride) (PVDF) or other fluorpolymer, poly (vinyl chloride) (PVC), or polyester, around the optical fiber.

Figure 3:
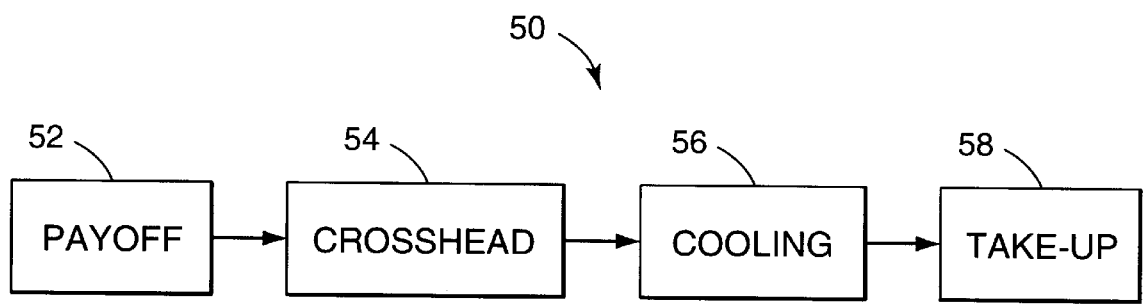
FIG. 3 is a simplified block diagram of an optical fiber buffering line with parameters in accordance with an embodiment of the invention.

Referring now to FIG. 3 with continuing reference to FIGS. 1a–c and 2, a simplified block diagram of an optical fiber buffering line 50 is shown. Initially, the coated optical fiber is payed off from a payoff 52 (also referred to as a payout). The coated optical fiber then is drawn through a crosshead 54, which forms one or more buffer layers around the coated optical fiber. The crosshead 54 contains, e.g., an extruder (not shown) that extrudes the buffer layers. e.g., inner buffer layer 23 and outer buffer layer 24, around the coated optical fiber. Upon passing through the crosshead 54, the now-buffered optical fiber passes through a cooling station 56 to be cooled, e.g., in a conventional manner. Upon being cooled, the buffered optical fiber is drawn through a pulling device at a suitable tension onto a takeup reel 58.

According to embodiments of the invention, a controlling step 46 controls the manner in which the buffer layers are formed around the coated optical fiber. Such control affects the size and frequency of the bubbles 26 that ultimately are maintained in the buffer region 22 and that, in turn, affect attenuation within the buffered optical fiber.

It is believed that, according to embodiments of the invention, bubbles in the buffer layer or layers are formed by the outgassing of moisture (e.g., from the coating layers to the buffer layers) and low molecular weight components present in the UV acrylate coating layers. If the amount of low molecular weight components present in the acrylate is considered relatively constant. then the amount of bubbles formable in the buffer layer or layers is variable by controlling the amount of moisture present in the acrylate coating.

Also, the number of bubbles formed in the buffer region is determined by other factors including, e.g., the hydrophilic nature of the coating, the melt temperature of the buffer material, the latent heat of the buffer region. the speed of the optical fiber buffering line 50, and the distance between buffer line components (in particular, between the payoff 52 and the crosshead 54). Thus, the controlling step 46 includes controlling and/or adjusting one or more of these parameters in a conventional manner.

Also. a separate step 48 for affecting the size and frequency of the bubbles within the buffer region 22 includes controlling the moisture level within the coating layers. One specific technique for controlling the moisture level within the coating layers is to pre-condition the coated optical fiber prior to forming the buffer region thereon. For examples the relative humidity of the payoff is controlled to facilitate control of moisture content in the optical fiber. Alternatively, the coated optical fibers are subjected to, e.g., a relative humidity for a set amount of time prior to the buffer region being formed thereon. In this manner, the level of moisture within the coating region is controlled, which, in turn, affects the size and frequency of bubbles formed in the buffer region.

EXAMPLE 1

The following example is for illustration purposes only and is not meant to be a limitation of embodiments of the invention. In this example, two 9 kilometer (km) standard multimode fibers manufactured by Lucent Technologies Inc. were used. For reference purposes, the two fibers were labeled as Fiber A and Fiber B. The fibers were divided by removing 500 meter sections from the beginning, middle and end of each 9 km fiber. Of the two remaining 3.75 km sections per fiber. the first was designated 1 (i.e., Fiber A-1) and the second designated 2 (i.e., Fiber A-2). Each 3.75 km section was divided into three 1.25 km samples, for a total of 6 samples per fiber or twelve total samples. The 1 km samples were pre-conditioned as shown in Table 1. It should be noted that RH/21° C. indicates relative humidity at room temperature.

TABLE 1

| Fiber Number | Pre-Conditioning | Sample Codes |
| --- | --- | --- |
| Fiber A | 0% RH/21° C. | Fiber A-1-Low |
|  | 0% RH/21° C. | Fiber A-2-Low |
|  | ~50% RH/21° C. | Fiber A-1-Ambient |
|  | ~50% RH/21° C. | Fiber A-2-Ambient |
|  | 100% RH/21° C. | Fiber A-1-Hi |
|  | 100% RH/21° C. | Fiber A-2-Hi |
| Fiber B | 0% RH/21° C. | Fiber B-1-Low |
|  | 0% RH/21° C. | Fiber B-2-Low |
|  | ~50% RH/21° C. | Fiber B-1-Ambient |
|  | ~50% RH/21° C. | Fiber B-2-Ambient |
|  | 100% RH/21° C. | Fiber B-1-Hi |
|  | 100% RH/21° C. | Fiber B-1-Hi |

According embodiments of the invention, a number of processing parameters are held constant, as shown in Table 2.

TABLE 2

| Parameter | Setting |
| --- | --- |
| Extruder Tooling | Tube extrusion with applied vacuum |
| Extruder Temperatures - All zones | 380° F. (193° C.) |
| Line Speed | 125 feet/minute (38 meters/minute) |
| Material | poly(vinylidene fluoride) (PVDF) |

Also, according to embodiments of the invention, a number or processing parameters were varied to establish three discrete levels of bubble formation in the fiber samples. However, some of the processing parameters were adjusted to maintain to consistent bubble formation levels. Tables 3 shows the variable processing parameters and the setting used to establish three levels of bubble formation (e.g., "low", "medium" and "high"). Also, the corresponding pre-conditioning of the twelve fiber samples is identified.

TABLE 3

| Bubble Frequency | Fiber Pre-Conditioning | Parameter | Settings |
| --- | --- | --- | --- |
| Low | 0% RH | Payout | Heater @ 260° F. (127° C.) no water in payout pans |
|  |  | On-line heater | 650° F. (343° C.) |
|  |  | Cooling | 15 ft from crosshead |
| Medium | ~50% RH | Payout | Heater @ 140° F. (60° C.) no water in payout pans |
|  |  | On-line heater | 320° F. (160° C.) |
|  |  | Cooling | 9 ft from crosshead |
| High | 100% RH | Payout | No Heater (22° C.), water in payout pans |
|  |  | On-line heater | 320° F. (160° C.) |
|  |  | Cooling | 1 ft from crosshead |

The attenuation properties (dB/km) of the twelve fiber samples were tested, with the results of the "low" and "medium" humidity samples shown below in Table 4.

TABLE 4

| Sample | 1300 nm OTDR (dB/km) | Bandwidth (MHz-km) 850 nanometers | Bandwidth (MHz-km) 1300 nanometers |
| --- | --- | --- | --- |
| Fiber A-1-Low | 0.69 | 402 | 1116 |
| Fiber A-1-Ambient | 5.26 | 371 | 1947 |
| Fiber A-2-Low | 0.64 | 293 | 1552 |
| Fiber A-2-Ambient | 3.22 | 435 | 2086 |
| Fiber B-1-Low | 0.78 | 223 | 722 |
| Fiber B-1-Ambient | 3.28 | 336 | 962 |
| Fiber B-2-Low | 0.72 | 195 | 527 |
| Fiber B-2-Ambient | 3.70 | 256 | 882 |

Figure 4:
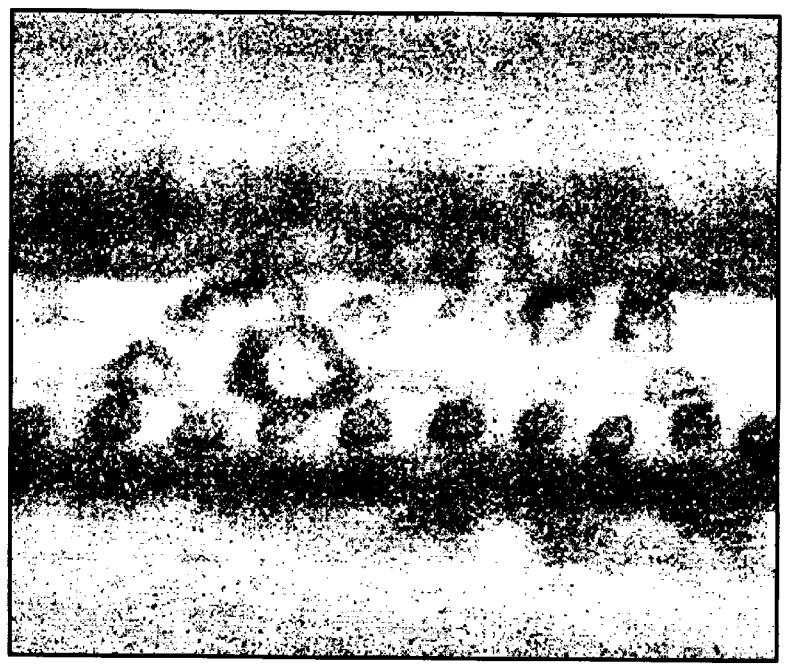
FIG. 4 is an optical photomicrograph of a portion of an optical energy transmission medium according to an embodiment of the invention.

FIG. 4 is a photomicrograph of a portion of an optical energy transmission medium according to an embodiment of the invention. More specifically, the fiber sample Fiber A-1-Hi is shown. The bubbles located at the coated fiber and the buffer region clearly are visible.

As discussed in great detail hereinabove, the bubbles shown in FIG. 4 are controllably formed within the optical fiber and advantageously cause a desired degree of microbending of the optical fiber. In this manner, mode coupling is controllable within the fiber in such a way that bandwidth characteristics are improved. e.g., reduced dispersion.

Also, in accordance with embodiments of the invention, it advantageously has been realized that the size and amount of bubbles formed in the optical fibers, among other factors, affects the force required to strip the optical fibers of their buffer region. Accordingly, controlling one or more of the processing parameters affecting the size and frequency of bubbles formed, in turn, controls the strip force of the optical fibers. See, for example, Table 5, in which strip force measurements according to the TIA/EIA-455-178A standard were performed on the fiber samples.

TABLE 5

| Sample | Peak Mean Load (lbs) | Average of Samples |
| --- | --- | --- |
| Fiber A-1-Low | 4.183 ± 0.145 | 4.50 ± 0.25 |
| Fiber A-2-Low | 4.577 ± 0.701 |  |
| Fiber B-1-Low | 4.453 ± 0.180 |  |
| Fiber B-2-Low | 4.781 ± 0.362 |  |
| Fiber A-1-Ambient | 3.896 ± 0.232 | 3.80 ± 0.20 |
| Fiber A-2-Ambient | 3.590 ± 0.219 |  |
| Fiber B-1-Ambient | 4.034 ± 0.311 |  |
| Fiber B-2-Ambient | 3.688 ± 0.262 |  |
| Fiber A-1-High | 3.787 ± 0.753 | 3.18 ± 0.53 |
| Fiber A-2-High | 2.921 ± 0.196 |  |
| Fiber B-1-High | 2.582 ± 0.172 |  |
| Fiber B-2-High | 3.438 ± 1.031 |  |

As can be seen from Table 5, in general. The strip force is lower for fiber samples having more bubbles, i.e., the "Ambient" and "High" fiber samples.

Figure 5:
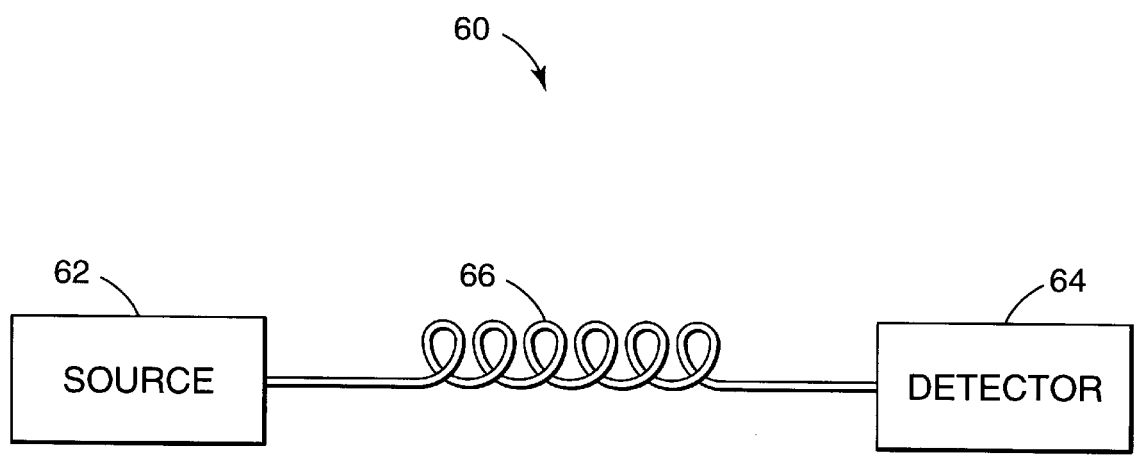
FIG. 5 is a simplified schematic diagram of an optical system in which embodiments of the invention are useful.

Referring now to FIG. 5, shown is a simplified schematic diagram of an optical system 60 in which embodiments of the invention are useful. The optical communications system 60 includes one or more optical sources 62, one or more optical detectors or receivers 64, and an optical energy transmission medium 66 such as one or more optical fibers. According to embodiments of the invention, the optical energy transmission medium 66 includes bubbles disposed therein for inducing microbending of the optical energy transmission medium, thus promoting advantageous mode coupling, which improves bandwidth potential, e.g., by reducing modal dispersion.

It will be apparent to those skilled in the art that many changes and substitutions can be made to the embodiments of the optical fiber systems. devices and methods of manufacturing herein described without departing from the spirit and scope of the invention as defined by the appended claims and their full scope of equivalents.

What is claimed is:

1. An optical waveguide system for transmitting optical energy, comprising:
    at least one source of optical energy;
    an optical energy transmission medium coupled to the source for transmitting optical energy from the source, wherein at least a portion of the optical energy transmission medium has a plurality of bubbles disposed therein for inducing microbending of the optical energy transmission medium in such a way that mode mixing is effected within the optical energy transmission medium; and
    a receiver coupled to the optical energy transmission medium for receiving optical energy from the source.

2. The system as recited in claim 1, wherein the optical energy transmission medium includes a buffer region having at least one buffer layer and wherein the plurality of bubbles is disposed within at least one of the buffer layers.

3. The system as recited in claim 1, wherein the optical energy transmission medium includes a core region, a cladding region formed around at least a portion of the core region and a coating region formed around at least a portion of the cladding region, wherein a buffer region is formed around at least a portion of the coating region, and wherein the plurality of bubbles is disposed within at least a portion of the buffer region and/or at the interface between the coating region and the buffer region.

4. A method of making an optical energy transmission medium, said method comprising the steps of:
    providing an optical energy transmission medium having a core region, a cladding region formed around at least a portion of the core region and a coating region formed around at least a portion of the cladding region; and
    forming a buffer region around at least a portion of the coating region,
    wherein the buffer region is formed in such a way that a plurality of bubbles is disposed in the optical energy transmission medium wherein the plurality of bubbles induce microbending of the optical energy transmission medium.

5. The method as recited in claim 4, wherein the buffer region includes an inner buffer layer formed around at least a portion of the coating region and an outer buffer layer formed around at least a portion of the inner buffer layer, and wherein the buffer region is formed in such a way that the plurality of bubbles is disposed within at least one of the inner and outer buffer layers and/or at the interface between the coating region and the buffer region.

6. The method as recited in claim 4, further comprising the step of controlling the forming step in such a way that a plurality of bubbles is disposed in the buffer region in such a way that induces microbending of the optical energy transmission medium.

7. The method as recited in claim 6, wherein the controlling step further comprises controlling the amount of moisture present in the coating region.

8. The method as recited in claim 4, wherein at least a portion of the buffer region includes a material selected from the group consisting of nylon, polyolefin, poly(vinylidene fluoride) (PVDF) or other fluorpolymer, poly(vinyl chloride) (PVC), or polyester.

9. A medium for transmitting optical energy within an optical communications system, comprising:
    a core region;
    a cladding region formed around at least a portion of the core region;
    a coating region formed around at least a portion of the cladding region;
    a buffer region formed around at least a portion of the coating region; and
    a plurality of bubbles disposed within the optical energy transmission medium for inducing microbending of the optical energy transmission medium in such a way that mode mixing is effected within the optical energy transmission medium.

10. The medium as recited in claim 9, wherein the plurality of bubbles is disposed within at least a portion of the buffer region and/or at the interface between the coating and buffer regions.

11. The medium as recited in claim 9, wherein at least a portion of the buffer region includes a material selected from the group consisting of nylon, polyolefin, poly(vinylidene fluoride) (PVDF) or other fluorpolymer, poly(vinyl chloride) (PVC), or polyester.

12. The medium as recited in claim 9, wherein the buffer region includes an inner buffer layer formed around at least a portion of the coating region and an outer buffer layer formed around at least a portion of the inner buffer layer, and wherein the plurality of bubbles is disposed within at least one of the inner and outer buffer layers and/or at the interface between the inner buffer layer and the coating region.

13. A method of transmitting optical energy in an optical communications system including a source of optical energy, at least one receiver for receiving optical energy and an optical energy transmission medium operably coupled to the source and the receiver for transmitting optical energy therebetween, said method comprising the steps of:
    providing an optical energy transmission medium having a plurality of bubbles disposed therein for inducing microbending of the optical energy transmission medium in such a way that mode mixing is effected within the optical energy transmission medium; and
    transmitting optical energy from the source to the receiver through the optical energy transmission medium, wherein the microbending in the optical energy transmission medium causes the transmitted optical energy to be mode-mixed.

14. The method as recited in claim 13, wherein the optical energy transmission medium includes a core region, a cladding region formed on at least a portion of the core region, a coating region formed on at least a portion of the cladding region and a buffer region formed on at least a portion of the coating region, wherein the plurality of bubbles is disposed within the buffer region and/or at the interface between the coating region and the buffer region.

15. The method as recited in claim 13, wherein the optical energy transmission medium includes a buffer region having at least one buffer layer, and wherein the plurality of bubbles is disposed within at least one of the buffer layers.

16. The method as recited in claim 13, wherein the optical energy transmission medium includes a core region, a cladding region formed around at least a portion of the core region and a coating region formed around at least a portion of the cladding region, wherein a buffer region is formed around at least a portion of the coating region, and wherein the plurality of bubbles is disposed within at least a portion of the buffer region and/or at the interface between the coating and buffer regions.

* * * * *